United States Patent
Wei et al.

(10) Patent No.: US 11,552,697 B2
(45) Date of Patent: Jan. 10, 2023

(54) INFRASTRUCTURE EQUIPMENT, COMMUNICATIONS DEVICES AND METHODS

(71) Applicant: Sony Group Corporation, Tokyo (JP)

(72) Inventors: Yuxin Wei, Basingstoke (GB); Vivek Sharma, Basingstoke (GB); Samuel Asangbeng Atungsiri, Basingstoke (GB); Yassin Aden Awad, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/312,942

(22) PCT Filed: Dec. 10, 2019

(86) PCT No.: PCT/EP2019/084403
§ 371 (c)(1),
(2) Date: Jun. 11, 2021

(87) PCT Pub. No.: WO2020/126666
PCT Pub. Date: Jun. 25, 2020

(65) Prior Publication Data
US 2022/0021444 A1 Jan. 20, 2022

(30) Foreign Application Priority Data
Dec. 20, 2018 (EP) .................... 18214932

(51) Int. Cl.
*H04B 7/185* (2006.01)
*H04B 7/204* (2006.01)

(52) U.S. Cl.
CPC ..... *H04B 7/18508* (2013.01); *H04B 7/18541* (2013.01); *H04B 7/2041* (2013.01)

(58) Field of Classification Search
None
See application file for complete search history.

(56) References Cited

U.S. PATENT DOCUMENTS

2019/0082335 A1* 3/2019 Yu .................. H04B 7/088

OTHER PUBLICATIONS

Huawei et al., "Beam Failure Recovery for Scell", 3GPP TSG RAN WG1 Meeting #95, R1-1813561, November R2-16, 2018, 7 pages. (Year: 2018).*

(Continued)

*Primary Examiner* — Shripal K Khajuria
(74) *Attorney, Agent, or Firm* — Xsensus LLP

(57) ABSTRACT

A method for operating an infrastructure equipment forming part of a wireless communications network, which includes a base station and a non-terrestrial network part, the non-terrestrial network part transmitting a plurality of spot beams to provide a wireless access interface for transmitting signals to and receiving signals representing data from a communications device within a coverage region formed by a first of the spot beams. The method comprises receiving assistance information from the communications device, identifying, based on the received assistance information, that a backup configuration should be updated to indicate one or more others of the spot beams, the one or more others of the spot beams being backups to the first spot beam in case of beam failure of the first spot beam, and transmitting a backup beam reconfiguration message to the communications device, the backup beam configuration message comprising an indication of the updated backup configuration.

15 Claims, 7 Drawing Sheets

(56) References Cited

OTHER PUBLICATIONS

CMCC, "Utilization of Beam Footprint Information for Mobility Management", 3GPP TSG-RAN WG2 Meeting #104, R2-1818133, Nov. 12-16, 2018, 3 pages. (Year: 2018).*

International Search Report and Written Opinion dated Feb. 6, 2020, received for PCT Application PCT/EP2019/084403, Filed on Dec. 10, 2019, 15 pages.

Holma et al., "LTE for UMTS OFDMA and SC-FDMA Based Radio Access", John Wiley and Sons, 2009, pp. 25-27.

NTT Docomo Inc., "Revised WID on New Radio Access Technology", 3GPP TSG RAN Meeting #78, RP-172834, Dec. 18-21, 2017, 11 pages.

CMCC, "Utilization of Beam Footprint Information for Mobility Management", 3GPP TSG-RAN WG2 Meeting #104, R2-1818133, Nov. 12-16, 2018, 3 pages.

Huawei et al., "Beam Failure Recovery for Scell", 3GPP TSG RAN WG1 Meeting #95, R1-1813561, Nov. 12-16, 2018, 7 pages.

Sony, "Discussions on Handover in NTN", 3GPP TSG RAN WG1 Meeting #93, R1-1807243, May 21-25, 2018, 4 pages.

Zte et al., "Discussion on Tracking Area Management in NTN", 3GPP TSG-RAN WG3 #101 bis, R3-185610, Oct. 8-12, 2018, pp. 1-6.

Huawei et al., "Remaining Issues on Beam Failure Recovery", 3GPP TSG RAN WG1 Meeting #93, R1-1805953, May 21-25, 2018, 6 pages.

3GPP TS 38.300; 3rd Generation Partnership Project; Technical Specification Group Radio Access Network; NR; NR and NG-RAN Overall Description; Stage 2, (Release 15) V15.2.0; Jun. 2018; 87 pages.

3GPP TR 38.811; 3rd Generation Partnership Project; Technical Specification Group Radio Access Network; Study on New Radio (NR) to support non terrestrial networks; (Release 15); V0.3.0; Dec. 2017; 56 pages.

3GPP TR 38.913; 3rd Generation Partnership Project; Technical Specification Group Radio Access Network; Study on Scenarios and Requirements for Next Generation Access Technologies (Release 14); V14 3.0; Jun. 2017; 39 pages.

* cited by examiner

INFRASTRUCTURE EQUIPMENT, COMMUNICATIONS DEVICES AND METHODS

CROSS-REFERENCE TO RELATED APPLICATIONS

The present application is based on PCT filing PCT/EP2019/084403, filed Dec. 10, 2019, which claims priority to EP 18214932.8, filed Dec. 20, 2018, the entire contents of each are incorporated herein by reference.

BACKGROUND

Field of Disclosure

The present disclosure relates generally to communications devices, infrastructure equipment and methods of operating communications devices and infrastructure equipment and specifically to methods of performing beam failure recovery in non-terrestrial networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method for operating an infrastructure equipment forming part of a wireless communications network. The wireless communications network comprises a base station and a non-terrestrial network part, the non-terrestrial network part transmitting a plurality of spot beams to provide a wireless access interface for transmitting signals to and receiving signals representing data from a communications device within a coverage region formed by a first of the spot beams forming a cell. The method comprises receiving assistance information from the communications device, identifying, based on the received assistance information, that a backup configuration should be updated to indicate one or more others of the spot beams, the one or more others of the spot beams being backups to the first spot beam in case of beam failure of the first spot beam, and transmitting a backup beam reconfiguration message to the communications device, the backup beam configuration message comprising an indication of the updated backup configuration Embodiments of the present technique, which further relate to methods of operating communications devices, communications devices, infrastructure equipment and circuitry for communications devices and infrastructure equipment, allow for performance and enhancement of beam failure recovery processes in non-terrestrial networks. Such enhanced beam failure recovery processes allow for legacy beam failure recovery procedures to be accelerated.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
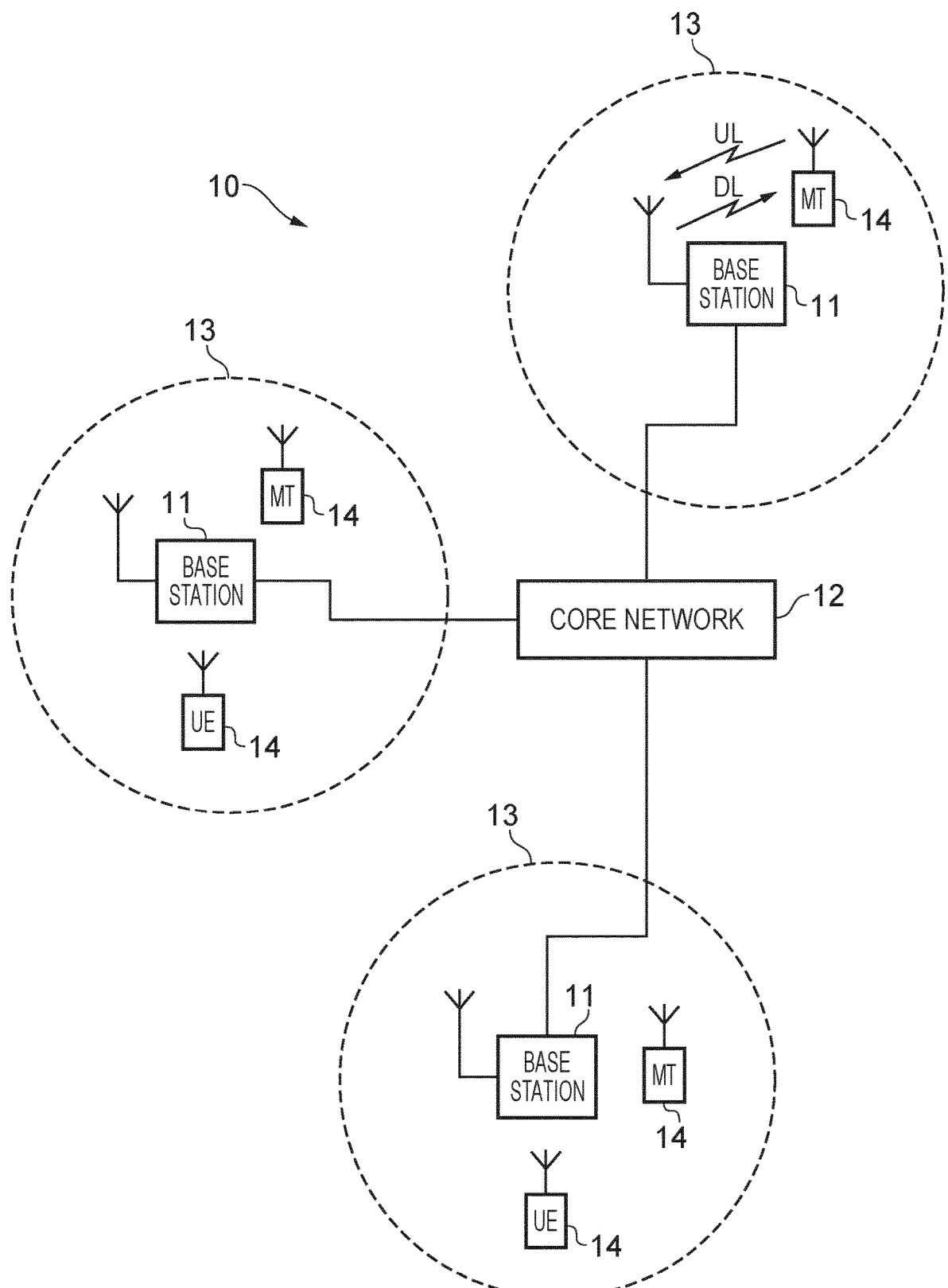
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [3]

eMBB services are characterised by high capacity with a requirement to support up to 20 Gb/s. The requirement for URLLC is a reliability of $1\text{-}10^{-5}$ (99.999%) for one transmission of a relatively short packet such as 32 bytes with a user plane latency of 1 ms [4].

The elements of the wireless access network shown in FIG. 1 may be equally applied to a 5G new RAT configuration, except that a change in terminology may be applied as mentioned above.

Figure 2:
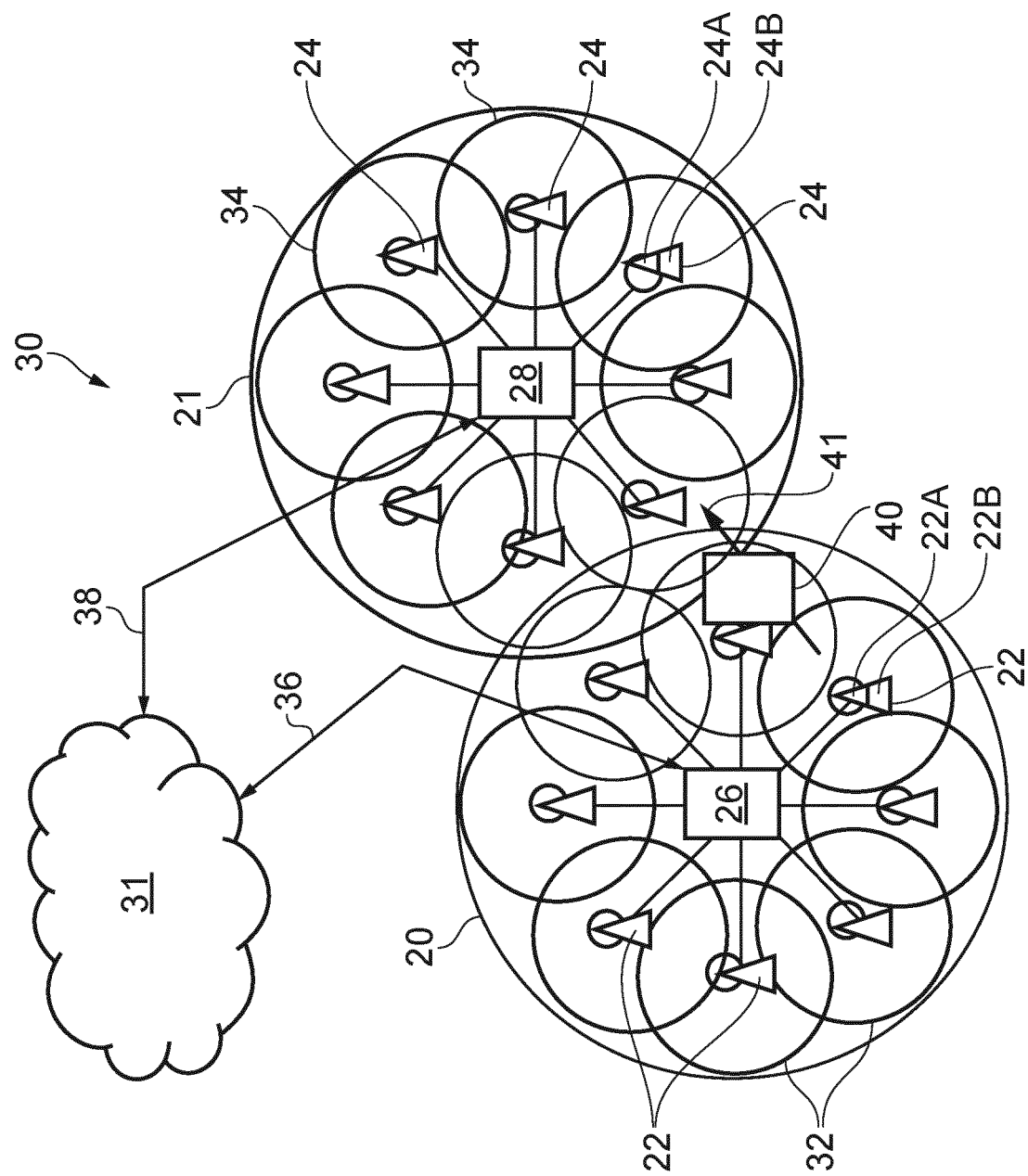
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

According to some radio access technologies, including the NR radio access technologies under development by 3GPP, a cell may be formed (or, in other words, 'generated') by a plurality of directional beams. Each beam may be characterised by a variance in gain with respect to a direction from the antenna; a beam may be considered 'wide', where the gain is consistently relatively high over a broad range of directions, or 'narrow', where relatively high gain is only achieved over a narrow range of directions. Depending on the direction of the communications device with respect to the infrastructure equipment, the gain of a particular beam may be sufficiently high (and the resulting coupling loss sufficiently low) to permit communications between the communications device and the infrastructure equipment via the beam. Beams may be formed for transmitting or receiving at the infrastructure equipment using phased antenna arrays, directional antennas, a combination of both, or other known techniques. Generally, a beam is named as a Transmission Configuration Indication (TCI) state in NR.

Non-Terrestrial Networks (NTNs)

Figure 3:
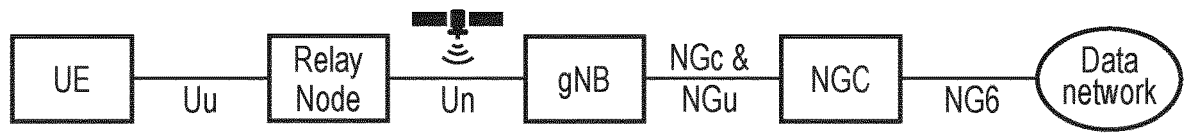
FIG. 3 is reproduced from [1], and illustrates a first example of an NTN featuring an access networking service relay nodes and based on a satellite/aerial with a bent pipe payload.
Figure 4:
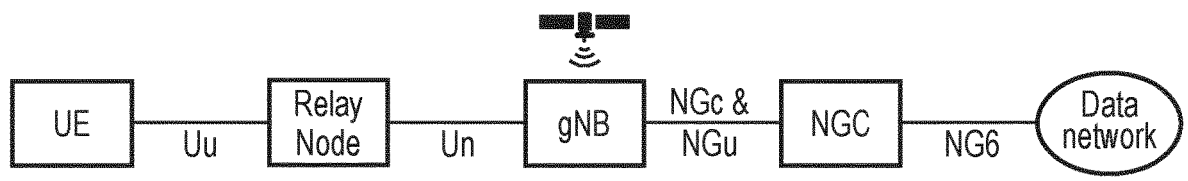
FIG. 4 is reproduced from [1], and illustrates a second example of an NTN featuring an access networking service relay nodes and based on a satellite/aerial coupled with a gNodeB.

An overview of NR-NTN can be found in [1], and much of the following wording, along with FIGS. 3 and 4, has been reproduced from that document as a way of background.

As a result of the wide service coverage capabilities and reduced vulnerability of space/airborne vehicles to physical attacks and natural disasters, Non-Terrestrial Networks are expected to:

- foster the roll out of 5G service in un-served areas that cannot be covered by terrestrial 5G network (isolated/remote areas, on board aircrafts or vessels) and under-served areas (e.g. sub-urban/rural areas) to upgrade the performance of limited terrestrial networks in cost effective manner,
- reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications, and to
- enable 5G network scalability by providing efficient multicast/broadcast resources for data delivery towards the network edges or even user terminal.

The benefits relate to either Non-Terrestrial networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive.

FIG. 3 illustrates a first example of an NTN featuring an access networking service relay nodes and based on a satellite/aerial with a bent pipe payload. In this example NTN, the satellite or the aerial will relay a "satellite friendly" NR signal between the gNodeB and the relay nodes in a transparent manner.

FIG. 4 illustrates a second example of an NTN featuring an access networking service relay nodes and based on a satellite/aerial coupled with a gNodeB. In this example NTN, the satellite or aerial embarks full or part of a gNodeB to generate or receive a "satellite friendly" NR signal to/form the relay nodes.

This requires sufficient on-board processing capabilities to be able to include a gNodeB or relay node functionality.

Relay node (RN) related use cases such as those shown in FIGS. 3 and 4 will play an important role in the commercial deployment of NTN; i.e. relay nodes mounted on high speed trains, relay nodes mounted in cruise ships, relay nodes at home/office and relay nodes mounted on airliners. It should be well understood by those skilled in the art that, in addition to such RNs, proposed solutions of embodiments of the present technique could be equally applied to conventional RNs/UEs.

Figure 5:
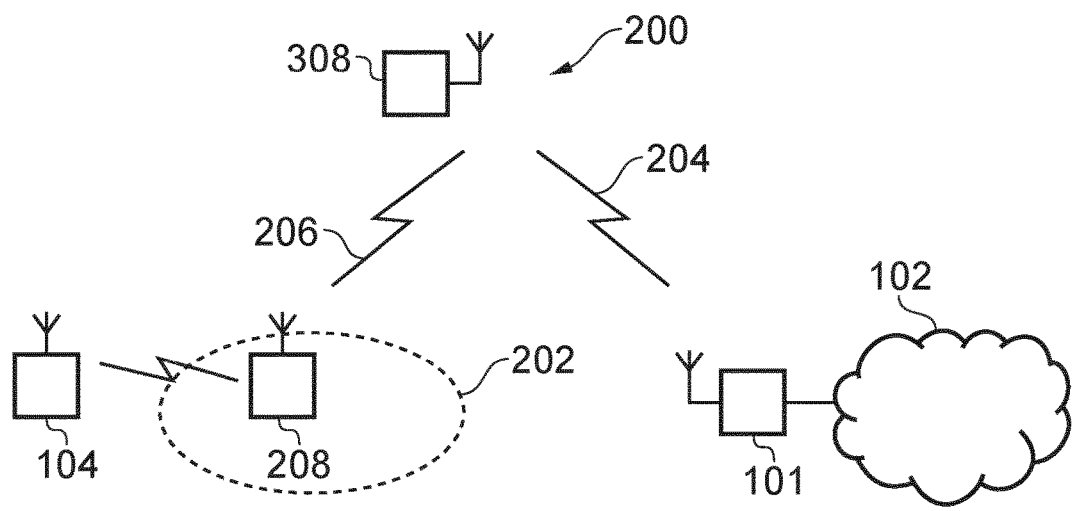
FIG. 5 schematically shows an example of a wireless communications system which may be configured to operate in accordance with embodiments of the present disclosure.

FIG. 5 schematically shows an example of a wireless communications system 200 which may be configured to operate in accordance with embodiments of the present disclosure. The wireless communications system 200 in this example is based broadly around an LTE-type or 5G-type architecture. Many aspects of the operation of the wireless communications system/network 200 are known and understood and are not described here in detail in the interest of brevity. Operational aspects of the wireless communications system 200 which are not specifically described herein may be implemented in accordance with any known techniques, for example according to the current LTE-standards or the proposed 5G standards.

The wireless communications system 200 comprises a core network part 102 (which may be a 5G core network or a NG core network) coupled to a radio network part. The radio network part comprises a base station (g-node B) 101 coupled to a non-terrestrial network part 308. The non-terrestrial network part 308 may be an example of infrastructure equipment. Alternatively, or in addition, the non-terrestrial network part 308 may be mounted on a satellite vehicle or on an airborne vehicle.

The non-terrestrial network part 308 is further coupled to a communications device 208, located within a cell 202, by means of a wireless access interface provided by a wireless communications link 206. For example, the cell 202 may correspond to the coverage area of a spot beam generated by the non-terrestrial network part 308. The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary earth orbit (GEO) such that the non-terrestrial network part 308 does not move with respect to a fixed point on the Earth's surface. The geo-stationary earth orbit may be approximately 36,000 km above the Earth's equator. Alternatively, the satellite may be in a non-geostationary orbit (NGSO), so that the non-terrestrial network part 308 moves with respect to a fixed point on the Earth's surface. The non-terrestrial network part 308 may be an airborne vehicle such as an aircraft, or may be mounted on such a vehicle. The airborne vehicle (and hence the non-terrestrial network part 308) may be stationary with respect to the surface of the Earth or may move with respect to the surface of the Earth.

In FIG. 5, the base station 101 is shown as ground-based, and coupled to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 206. Similarly, the non-terrestrial network part 308 receives signals representing uplink data transmitted by the communications device 206 via the wireless access interface comprising the wireless communications link 206 and transmits signals representing the uplink data to the base station 101 on the wireless communications link 204. The wireless communications links 204, 206 may operate at a same frequency, or may operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206. Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

The non-terrestrial network part 308 may be configured to perform some of the functionality conventionally carried out by the base station 101. In particular, latency-sensitive functionality (such as acknowledging a receipt of the uplink data, or responding to a Random Access (RACH) request, which would be well known to those skilled in the art) may be performed by the non-terrestrial network part 308 instead of by the base station 101.

The base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the base station 101 and the non-terrestrial network part 308. In such co-located arrangements, a wireless communications link between the base station 101 and a ground station (not shown) may provide connectivity between the base station 101 and the core network part 102.

The communications device 208 shown in FIG. 5 may be configured to act as a relay node. That is, it may provide connectivity to one or more terminal devices such as the terminal device 104. When acting as a relay node, the communications device 208 transmits and receives data to and from the terminal device 104, and relays it, via the non-terrestrial network part 308 to the base station 101. The communications device 208, acting as a relay node, may thus provide connectivity to the core network part 102 for terminal devices which are within a transmission range of the communications device 208.

It will be apparent to those skilled in the art that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which is coupled to the non-terrestrial network part 308.

There is a need to ensure that connectivity for the communications device 208 with the base station 101 can be maintained, in light of the movement of the communications device 208, the movement of the non-terrestrial network part 308 (relative to the Earth's surface), or both. According to conventional cellular communications techniques, a decision to change a serving cell of the communications device 208 may be based on measurements of one or more characteristics of a radio frequency communications channel, such as signal strength measurements or signal quality measurements. In a terrestrial communications network, such measurements may effectively provide an indication that the communications device 208 is at, or approaching, an edge of a coverage region of a cell, since, for example, path loss may broadly correlate to a distance from a base station. However, such conventional measurement-based algorithms may be unsuitable for cells generated by means of the transmission of beams from a non-terrestrial network part, such as the cell 202 generated by the non-terrestrial network part 308. In particular, path loss may be primarily dependent on an altitude of the non-terrestrial network part 308 and may vary only to a very limited extent (if at all) at the surface of the Earth, within the coverage region of the cell 202.

A further disadvantage of conventional techniques may be the relatively high rate at which cell changes occur for the communications device 208 obtaining service from one or more non-terrestrial network parts. For example, where the non-terrestrial network part 308 is mounted on a satellite in a low-earth orbit (LEO), the non-terrestrial network part 308 may complete an orbit of the Earth in around 90 minutes; the coverage of a cell generated by the non-terrestrial network part 308 will move very rapidly, with respect to a fixed observation point on the surface of the earth. Similarly, it may be expected that the communications device 208 may be mounted on an airborne vehicle itself, having a ground speed of several hundreds of kilometres per hour.

Unlike camping on a terrestrial cell, a RN/UE camps on a spot beam of a satellite which, in the case of (non-geostationary earth orbit (NGSEO) satellites, does move. This means that a RN/UE will camp on different spot beams (cells) and/or different satellites over time, regardless of whether or not the RN/UE itself is moving. As a result, it is foreseen that handover will likely be carried out much more frequently than in conventional terrestrial-based wireless networks, especially for LEO NTNs. For GEO NTNs, the spot beam coverage does not move, but handover will still be needed if the RN/UE is moving between the coverage of different spot beams. Handover procedure should be optimised in order to reduce the signalling overhead.

Beam Failure Recovery (BFR) in NR

Provided at least one activated beam (or TCI state) remains available for communication, then beam management processes can update and adapt the set of activated beams in response to one or more beams becoming unsuitable. Such beam management as used herein refers collectively to processes and techniques such as the measurement of signals transmitted on one or more beams, an assessment as to whether one or more beams satisfy respective beam failure conditions, indications transmitted by the communications device to the infrastructure equipment to indicate whether or not one or more beams satisfy respective beam failure conditions, a determination that the configuration or activated set of beams are modified, and transmissions indicating control information relating to the beams sent using an activated beam which has not satisfied the beam failure conditions. However, should all beams satisfy the beam failure conditions based on measurements from pre-configured reference signals, then it is necessary to initiate a procedure to recover from this situation. This procedure is referred to as beam failure recovery.

In more detail for NR, the beam failure recovery (BFR) procedure is introduced in [5]. As described in [5], for beam failure detection, the gNodeB configures the UE with beam failure detection reference signals and the UE declares beam failure when the number of beam failure instance indications from the physical layer reaches a configured threshold within a configured period. After beam failure is detected, the UE:

triggers beam failure recovery by initiating a Random Access procedure on the PCell;

selects a suitable beam to perform beam failure recovery (if the gNodeB has provided dedicated Random Access resources for certain beams, those will be prioritised by the UE);

Receives gNodeB responses (i.e. DCI) on a preconfigured search space named as "recoverySearchSpaceId".

Upon completion of the Random Access procedure, beam failure recovery is considered complete.

In an example beam failure recovery procedure initiated in response to a determination that activated beams satisfy the respective beam failure conditions, the communications device performs measurements of the signal strength (e.g. reference signal received power, RSRP) of the channel state information reference signals (CSI-RS) or synchronisation signal blocks associated with one or more beams which are configured but not activated. The measurements may be compared against a predetermined threshold, such as an RSRP threshold. If the communications device determines that the measurements associated with the one or more beams which are configured but not activated exceed the predetermined threshold, then the communications device transmits a beam failure recovery request message (which is an example of a beam failure indication) as a random access message using a physical random access channel (PRACH) of the new identified beam. Communications resources on the PRACH may have been previously indicated as suitable for non-contention based random access transmissions, in which case the beam failure recovery request message may be transmitted in a contention-free manner using those resources. Otherwise, the beam failure recovery request message may be transmitted in a contention based manner if dedicated resources are not configured.

After transmitting the beam failure recovery request message, the communications device monitors downlink communications resources associated with the new identified beam. More specifically, the communications device may monitor a configured recovery search space, which may be a 'recoverySearchSpace' as described above with relation to [5], having as an identity a 'recoverySearchSpaceId', for downlink control information (DCI). If the communications device receives downlink control information in the configured communications resources, which indicates that communications resources on a shared downlink channel (such as the physical downlink shared channel, PDSCH) are scheduled to be used for the transmission by the infrastructure equipment of a response to the beam failure recovery request message, then the communications device determines that the beam failure recovery is successful. In response to receiving the downlink control information, the communications device sets the new identified beam as an activated beam. The new (activated) beam can be used for subsequent communications between the infrastructure equipment and the communications device, including the transmission of control information to indication one or more beams which are to be activated for the communications device. The communications device may decode and process data transmitted using the scheduled communications resources on the shared downlink channel, for example in a conventional manner.

As described above, in NTN, the cell change/beam change procedure due to the satellite beam's movement is regarded as a handover/beam management procedure. One of the characteristics of such handover/beam management in NTN is that the target cell/satellite beam is somewhat predictable given the knowledge of satellite ephemeris (i.e. the position of the satellite in the sky at given times), the beam and satellite constellation, the UE's location and velocity information.

Figure 6:
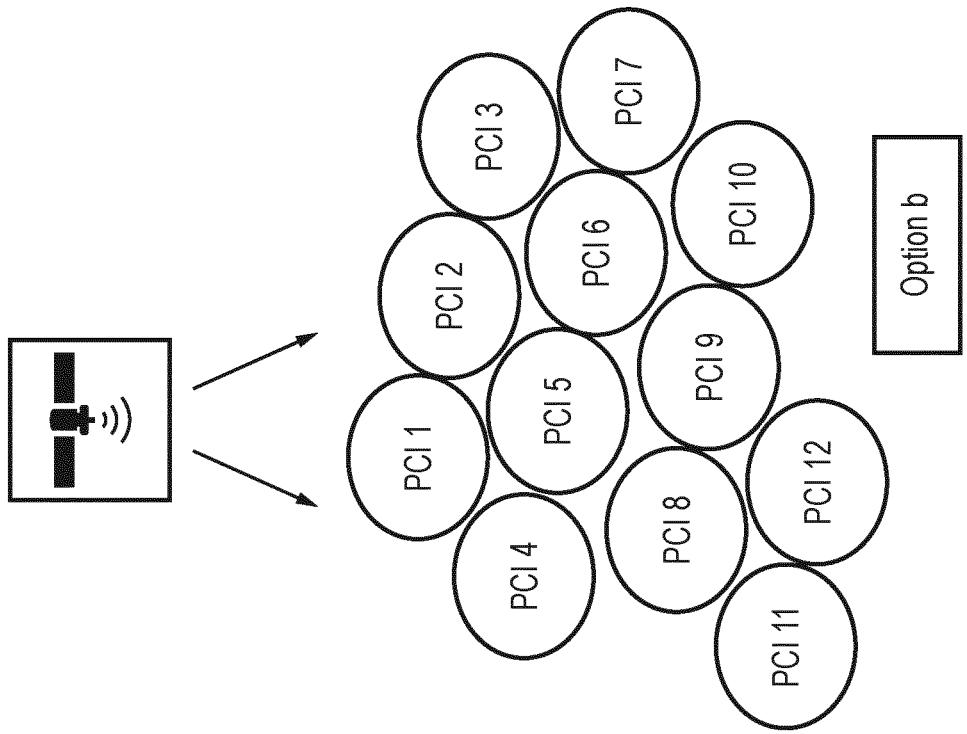
FIG. 6 shows two example options of how satellite beams may be distinguished in NTN; by having different—synchronisation signal block (SSB) in the same Physical Cell Identifier (PCI) group in Option a) and by being associated with different PCIs in Option b)
Figure 6:
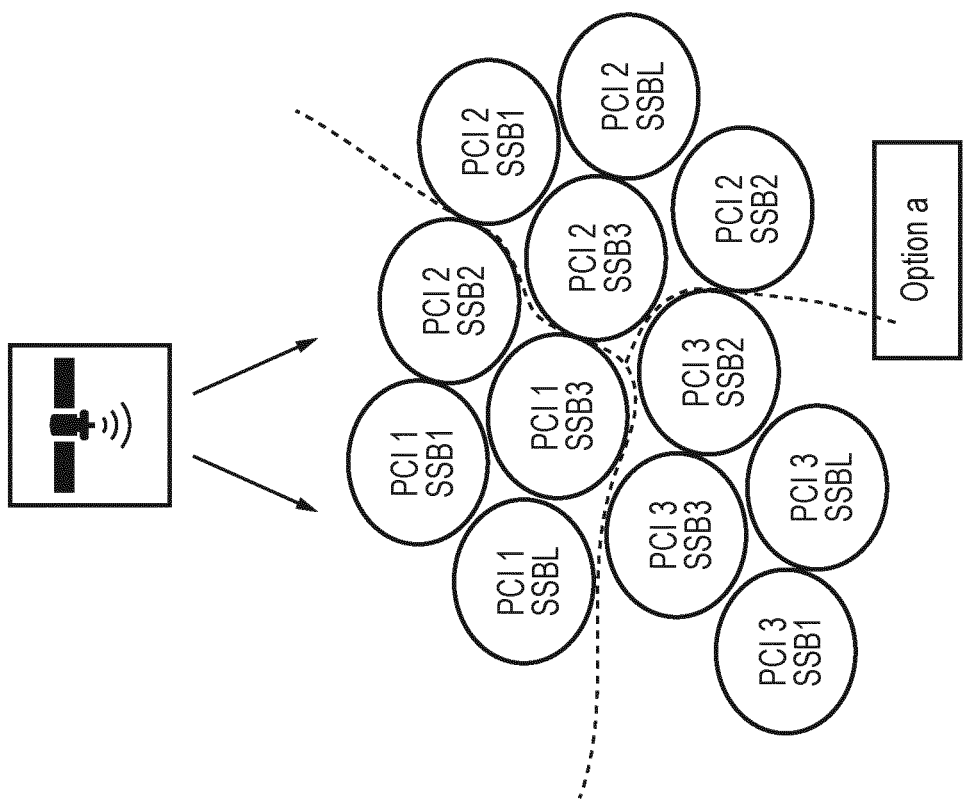

While, as in NR, a UE may still encounter beam failure in NTN, this may be in one of a number of ways, depending on the arrangement of the satellite beams as demonstrated by FIG. 6. In Option a) of FIG. 6, a single Physical Cell Identifier (PCI) may be shared between a number of satellite beams, essentially between them forming a single cell (shown by the dotted lines), and each satellite beam of that cell may be formed of one (or several) Synchronisation Signal Blocks (SSBs). In Option b) of FIG. 6 on the other hand, each satellite beam may be associated with a unique PCI, thus in effect each forming a separate cell.

The UE may detect a beam failure if, for example, an airplane flying within the beam between the UE and the satellite shadows the UE sufficiently to cause a break in its signal. One of the characteristics of NR beam failure is that the target beam is not predictable. However, in NTN, there is some predictability on the target beam, implying that certain enhancements can be applied in NTN for a smoother beam failure recovery. Furthermore, in NR, the beam failure recovery will trigger a contention-less random access procedure. Due to the long propagation delay issue, beam failure recovery should be enhanced in NTN. Embodiments of the present technique seek to provide enhancements to beam failure recovery processes in the context of NTN.

BFR Enhancement in NTN

Figure 7:
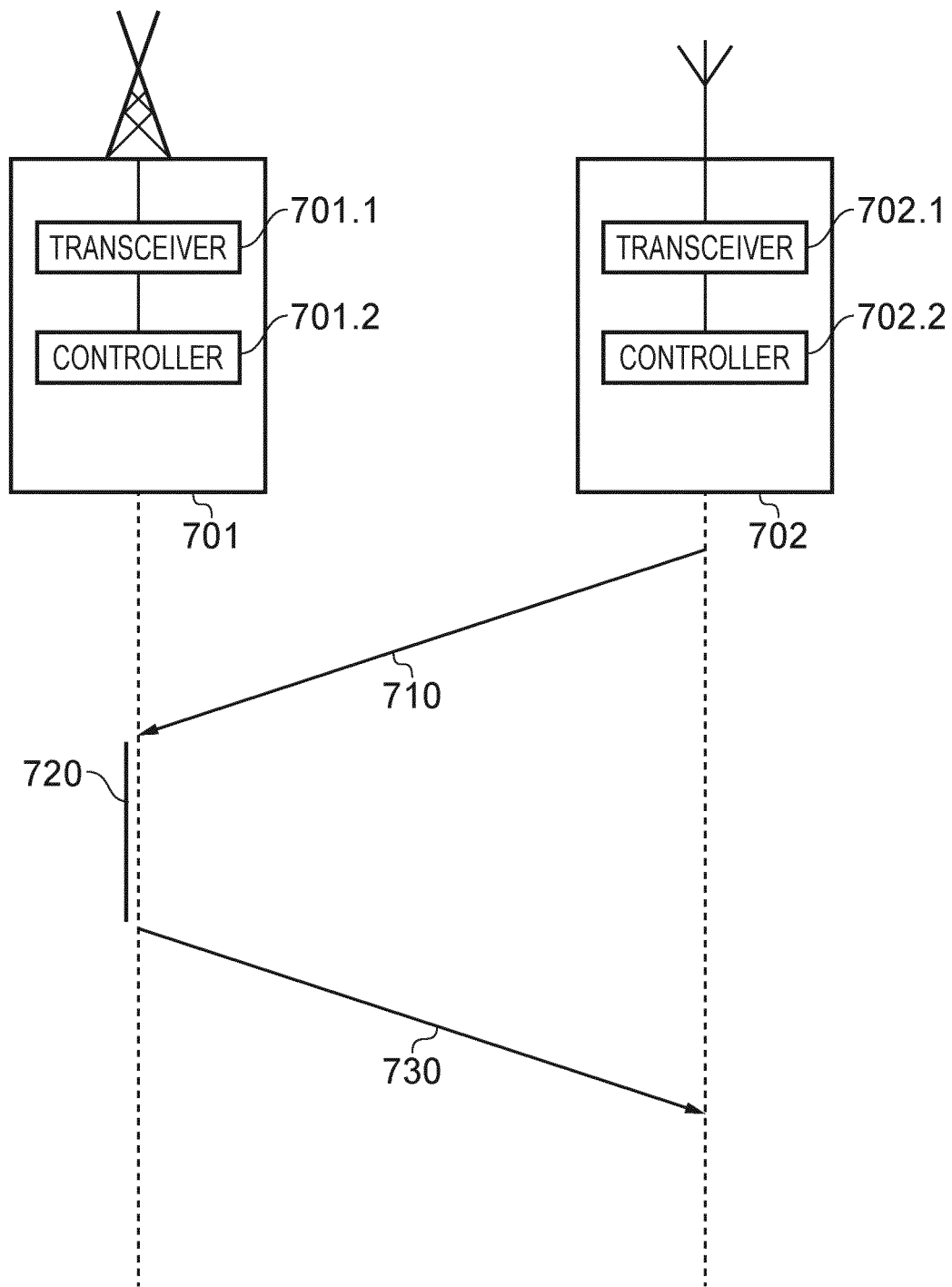
FIG. 7 shows a part schematic, part message flow diagram representation of a wireless communications network comprising an infrastructure equipment and a communications device in accordance with embodiments of the present technique.

FIG. 7 shows a part schematic, part message flow diagram representation of a wireless communications network comprising an infrastructure equipment 701 and a communications device 702 in accordance with embodiments of the present technique. The wireless communications network comprises a base station and a non-terrestrial network part, the non-terrestrial network part transmitting a plurality of spot beams to provide a wireless access interface for transmitting signals to and receiving signals representing data from the communications device 702 within a coverage region formed by a first of the spot beams.

The infrastructure equipment 701 and the communications device 702 each comprise a transceiver (or transceiver circuitry) 701.1, 702.1, and a controller (or controller circuitry) 701.2, 702.2. Each of the controllers 701.2, 702.2 may be, for example, a microprocessor, a CPU, or a dedicated chipset, etc.

The transceiver circuitry 701.1 and the controller circuitry 701.2 of the infrastructure equipment 701 are configured in combination to receive 710 assistance information from the communications device 702, to identify 720, based on the received assistance information, that a backup configuration should be updated to indicate one or more others of the spot beams, the one or more others of the spot beams being backups to the first spot beam in case of beam failure of the first spot beam, and to transmit 730 a backup beam reconfiguration message to the communications device 702, the backup beam configuration message comprising an indication of the updated backup configuration. In some arrangements of embodiments of the present technique, the assistance information may comprise a location report, the location report indicating a geographical area in which the communications device is located. In other arrangements of embodiments of the present technique, the assistance information may comprise measurement information relating to measurements performed by the communications device, or to reference signals transmitted by the communications device.

Figure 8:
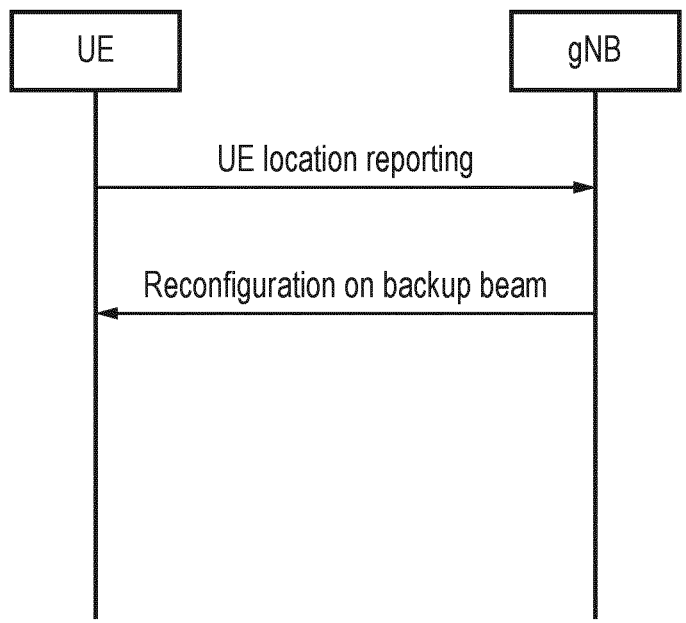
FIG. 8 shows an example of a backup beam reconfiguration process in accordance with embodiments of the present technique.

In NR BFR, the UE is configured via RRC with RACH resources and candidate beams in the BeamFailureRecoveryConfig Information Element (IE) for beam failure recovery in case of beam failure detection. Since UE location reporting is to be introduced in NTN, every time the network receives such location information of the UE, it is able to evaluate whether or not the BeamFailureRecoveryConfig IE needs to be re-configured according to the UE's current location, or according to the satellite ephemeris, satellite constellation or beam distribution of the non-terrestrial network part. In other words, the identifying that the backup configuration should be updated is further based on one or more of ephemeris information of the non-terrestrial network part, a satellite constellation comprising the non-terrestrial network part, and a beam distribution of one or more of the plurality of spot beams transmitted by the non-terrestrial network part. Such a timely reconfiguration could accelerate beam failure recovery procedures once beam failure happens, thus allowing for more efficient systems where there are lower latencies and wasted transmissions on account of beam failures. An example of such a process is shown by FIG. 8.

The RACH procedure is used to set up uplink synchronisation of the UE with the network, and in the context of legacy beam recovery procedures, the RACH procedure is also used to tell the network which candidate beam is being selected for recovery. However in NTN, uplink synchronisation should not be a problem if the UE knows the satellite ephemeris and hence could calculate timing advances to any satellite cell/beam. However, in addition to performing this, the UE will need to notify the network which candidate beam is being selected as the new serving beam. In other words, the communications device is configured to detect, on the first spot beam satisfying a beam failure condition, beam failure of the first spot beam, to select one of the one or more others of the spot beams to use for transmitting signals to and receiving signals from the one of the base station and the non-terrestrial network part, to provide an indication to the one of the base station and the non-terrestrial network part of the selected one of the one or more others of the spot beams, and to transmit signals to the one of the base station and the non-terrestrial network part in using the selected one of the one or more others of the spot beams.

Figure 9:
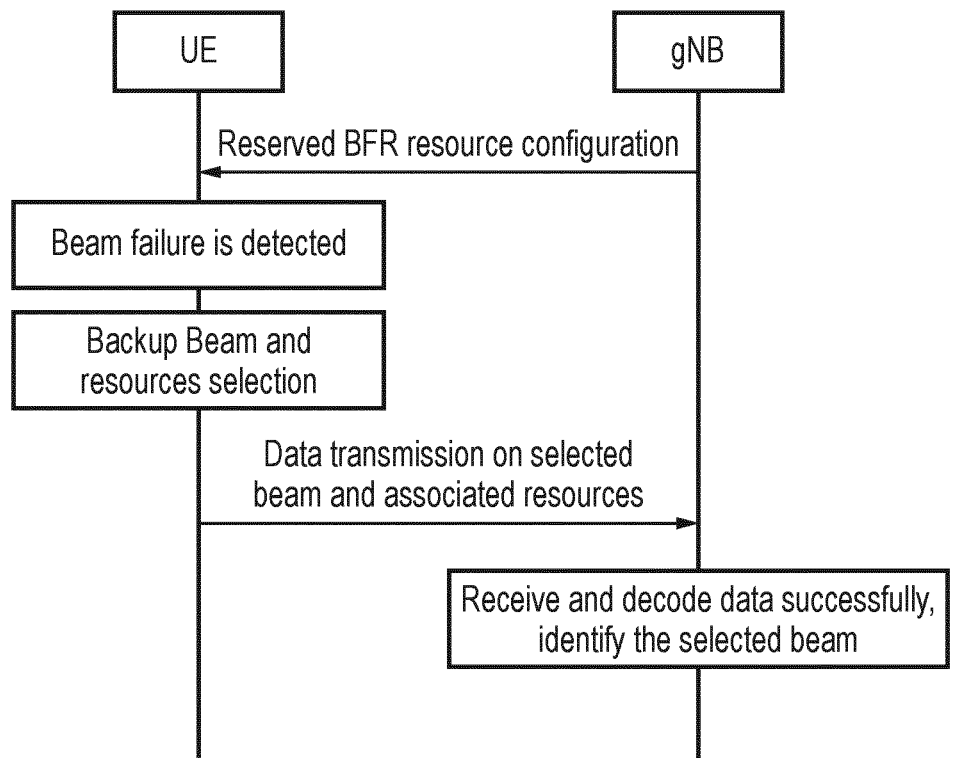
FIG. 9 shows an example of a beam failure recovery process in NTN in accordance with embodiments of the present technique.

In some arrangements of embodiments of the present technique, the network will reserve a set of resources (time, frequency or e.g. configured grant, PUCCH/PUSCH resources) for the UE to employ during the beam failure recovery procedure. Each set of resources will be associated with a specific beam (e.g. backup beam). This means that from the resources, the network can identify which beam is being used. In other words, each of the spot beams is associated with a reserved set of radio resources of the wireless access interface, the reserved set of radio resources associated with each of the spot beams being unique to that spot beam. The infrastructure equipment may be configured to transmit an indication of the reserved set of radio resources associated with each of the one or more others of the spot beams to the communications device. The infrastructure equipment is configured to receive signals (e.g. representing data) from the communications device in the reserved set of radio resources of one of the one or more others of the spot beams instead of the first spot beam, to determine, based on the reserved set of radio resources in which the signals are received, that the communications device has detected beam failure of the first spot beam, and to transmit an acknowledgement to the communications device, the acknowledgement indicating that the signals have been successfully received by the infrastructure equipment via the one of the one or more others of the spot beams Here, the communications device is configured to detect, on the first spot beam satisfying a beam failure condition, beam failure of the first spot beam, to select one of the one or more others of the spot beams to use for transmitting signals to and receiving signals from the one of the base station and the non-terrestrial network part, wherein each of the one or more others of the spot beams is associated with a reserved set of resources of the wireless access interface, the reserved set of radio resources associated with each of the one or more others of the spot beams being unique to that spot beam, and to transmit signals (e.g. representing data) to the one of the base station and the non-terrestrial network part in the reserved set of resources of the selected one of the one or more others of the spot beams. The infrastructure equipment is then able to receive and decode these signals (which may represent data) and on doing so, identify the backup beam selected by the communications device. Such a procedure is shown by FIG. 9. The beam failure condition may comprise a determination by the communications device that a measured characteristic of signals received using the first spot beam falls below a predetermined threshold. The measured characteristic may be at least one of a relative quality of the signals, a power with which the signals are received, and an error rate of the received signals.

This association will be either broadcast in system information or transmitted via dedicated signalling for a group of UEs or single UE. In other words, the indication of the reserved set of radio resources associated with each of the one or more others of the spot beams may be in system information broadcasted by the infrastructure equipment, or alternatively, the indication of the reserved set of radio resources associated with each of the one or more others of the spot beams may be transmitted to the communications device by the infrastructure equipment via dedicated signalling. If transmitted via broadcasting, the resources will be shared by all the UEs in the network. On the other hand, if transmitted via dedicated signalling, the resources could be shared among a specific group of UEs or a single UE, depending on network configurations.

When beam failure is detected, the UE will first find the best beam (for example, the beam with the strongest RSRP amongst its backup beams) and select the resources associated with that beam to transmit data (i.e. the signals) to network. In other words, the selected one of the one or more others of the spot beams is selected based on the selected spot beam having a highest reference signal received power from among the one or more others of the spot beams. After the network receives the data from that UE, it can figure out that beam failure has occurred and the beam through which it receives data is the selected beam for recovery. The network can then send the re-configuration message if necessary or send downlink data if there is any to send to the UE afterwards. After the UE receives the reconfiguration message or a DCI, the beam failure recovery procedure is considered complete.

It may be the case that the UE sends data but doesn't receive the acknowledgement from the network, as for example, a collision may happen on the sending of either the data or the acknowledgement. Based on the network configurations, which may for example be a pre-defined timer or a predetermined maximum collision number, the UE can fall-back to legacy BFR, e.g. that RACH based BFR procedure as described above. In other words, the communications device is configured to determine whether an acknowledgement has been received from the one of the base station and the non-terrestrial network part after the communications device has transmitted the signals to the one of the base station and the non-terrestrial network part in the reserved set of resources of the selected one of the one or more others of the spot beams, the acknowledgement indicating that the signals have been successfully received by the one of the base station and the non-terrestrial network part via the one of the one or more others of the spot beams, and to perform, if the communications device determines that the acknowledgement has not been received, a legacy beam failure recovery process.

It should be appreciated by those skilled in the art that the UE may not always have knowledge of the spot beams explicitly, or the spot beams themselves may not actually be directly visible to the UE. Thus, in embodiments of the present technique, wherever reference is made to a spot beam or spot beams from the point of view of communications devices, this should be understood to cover both the spot beam(s) themselves, or radio resources of the wireless access interface covered by or associated with the spot beam(s).

In some arrangements of embodiments of the present technique, the coverage region of the spot beam varies over time in accordance with a motion of the non-terrestrial network part with respect to the surface of the Earth. Alternatively, in some arrangements of embodiments of the present technique, a trajectory of the non-terrestrial network part is such that the coverage region of the spot beam is substantially constant over a time period.

In some arrangements of embodiments of the present technique, the infrastructure equipment is the non-terrestrial network part. Alternatively, the infrastructure equipment may be the base station. The non-terrestrial network part may comprise a satellite, an airborne vehicle or an airborne platform. The airborne platform may for example be a High Altitude Pseudo Satellite (HAPS), also termed High Altitude Platform Station, which are positioned typically in the stratosphere at an altitude of above 20 km. An example of a HAPS may be a station tethered to an aircraft or a balloon.

In some arrangements of embodiments of the present technique, the communications device is a user equipment. Alternatively, the communications device may act as a relay node for one or more user equipment, each of the one or more user equipment being in one of an RRC connected mode, an RRC idle state or an RRC inactive state.

As described above, each of the spot beams is (or alternatively, may be referred to as) a different one of a set of Transmission Configuration Indication (TCI) states.

Flow Chart Representation

Figure 10:
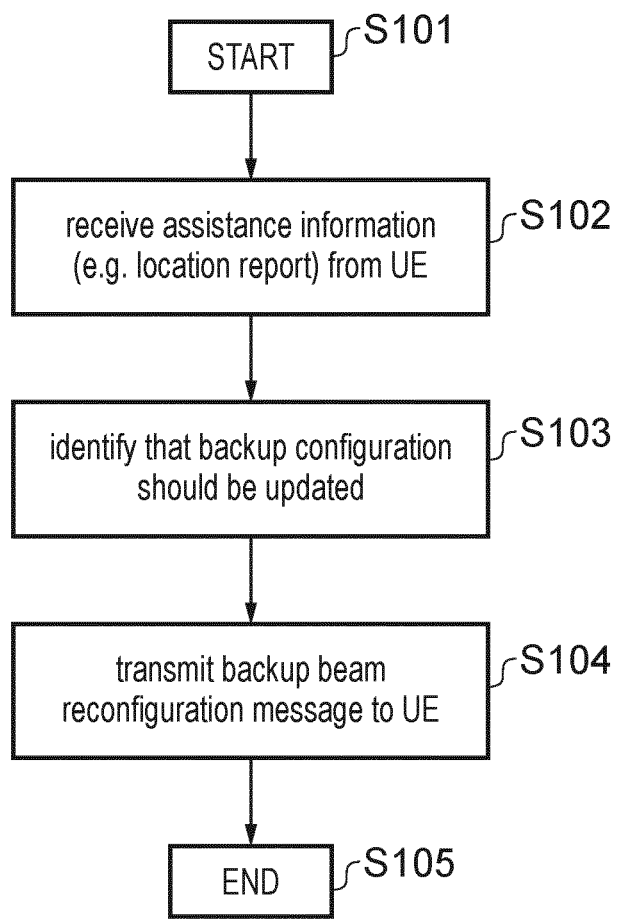
FIG. 10 is a flow diagram representation of a method of operating an infrastructure equipment according to embodiments of the present technique.

FIG. 10 shows a flow diagram illustrating a method of operating an infrastructure equipment forming part of a wireless communications network according to embodiments of the present technique. The wireless communications network comprises a base station and a non-terrestrial network part, the non-terrestrial network part transmitting a plurality of spot beams to provide a wireless access interface for transmitting signals to and receiving signals representing data from a communications device within a coverage region formed by a first of the spot beams. The method begins in step S101. The method comprises, in step S102, receiving assistance information from the communications device. In step S103, the process comprises identifying, based on the received assistance information, that a backup configuration should be updated to indicate one or more others of the spot beams, the one or more others of the spot beams being backups to the first spot beam in case of beam failure of the first spot beam. The method then advances to step S104, which comprises transmitting a backup beam reconfiguration message to the communications device, the backup beam configuration message comprising an indication of the updated backup configuration. The process ends in step S105.

Those skilled in the art would appreciate that the method shown by FIG. 10 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method for operating an infrastructure equipment forming part of a wireless communications network, the wireless communications network comprising a base station and a non-terrestrial network part, the non-terrestrial network part transmitting a plurality of spot beams to provide a wireless access interface for transmitting signals to and receiving signals representing data from a communications device within a coverage region formed by a first of the spot beams, the method comprising
    receiving assistance information from the communications device,
    identifying, based on the received assistance information, that a backup configuration should be updated to indicate one or more others of the spot beams, the one or more others of the spot beams being backups to the first spot beam in case of beam failure of the first spot beam, and
    transmitting a backup beam reconfiguration message to the communications device, the backup beam configuration message comprising an indication of the updated backup configuration.

Paragraph 2. A method according to Paragraph 1, wherein the assistance information comprises a location report, the location report indicating a geographical area in which the communications device is located.

Paragraph 3. A method according to Paragraph 2, wherein the identifying that the backup configuration should be updated is further based on one or more of ephemeris information of the non-terrestrial network part, a satellite constellation comprising the non-terrestrial network part, and a beam distribution of one or more of the plurality of spot beams transmitted by the non-terrestrial network part.

Paragraph 4. A method according to any of Paragraphs 1 to 3, wherein each of the spot beams is associated with a reserved set of radio resources of the wireless access interface, the reserved set of radio resources associated with each of the spot beams being unique to that spot beam.

Paragraph 5. A method according to Paragraph 4, comprising
    transmitting an indication of the reserved set of radio resources associated with each of the one or more others of the spot beams to the communications device.

Paragraph 6. A method according to Paragraph 5, wherein the indication of the reserved set of radio resources associated with each of the one or more others of the spot beams is in system information broadcasted by the infrastructure equipment.

Paragraph 7. A method according to Paragraph 5 or Paragraph 6, wherein the indication of the reserved set of radio resources associated with each of the one or more others of the spot beams is transmitted to the communications device by the infrastructure equipment via dedicated signalling.

Paragraph 8. A method according to any of Paragraphs 5 to 7, comprising
receiving signals from the communications device in the reserved set of radio resources associated with one of the one or more others of the spot beams instead of the first spot beam,
determining, based on the reserved set of radio resources in which the signals are received, that the communications device has detected beam failure of the first spot beam, and
transmitting an acknowledgement to the communications device, the acknowledgement indicating that the signals have been successfully received by the infrastructure equipment via the one of the one or more others of the spot beams.

Paragraph 9. A method according to any of Paragraphs 1 to 8, wherein the coverage region formed by the first spot beam varies over time in accordance with a motion of the non-terrestrial network part with respect to the surface of the Earth.

Paragraph 10. A method according to any of Paragraphs 1 to 9, wherein
a trajectory of the non-terrestrial network part is such that the coverage region formed by the first spot beam is substantially constant over a time period.

Paragraph 11. A method according to any of Paragraphs 1 to 10, wherein the infrastructure equipment is the non-terrestrial network part.

Paragraph 12. A method according to any of Paragraphs 1 to 11, wherein the infrastructure equipment is the base station.

Paragraph 13. A method according to any of Paragraphs 1 to 12, wherein the non-terrestrial network part comprises a satellite, an airborne vehicle or an airborne platform.

Paragraph 14. A method according to any of Paragraphs 1 to 13, wherein the communications device is a user equipment.

Paragraph 15. A method according to any of Paragraphs 1 to 14, wherein the communications device is acting as a relay node for one or more user equipment, each of the one or more user equipment being in one of an RRC connected mode, an RRC idle state or an RRC inactive state.

Paragraph 16. A method according to any of Paragraphs 1 to 15, wherein each of the spot beams is a different one of a set of Transmission Configuration Indication, TCI, states.

Paragraph 17. A method for operating a communications device in a wireless communications network, the wireless communications network comprising a base station and a non-terrestrial network part, the non-terrestrial network part transmitting a plurality of spot beams to provide a wireless access interface for transmitting signals to and receiving signals representing data from a communications device within a coverage region formed by a first of the spot beams, the method comprising
transmitting assistance information to one of the base station and the non-terrestrial network part, and
receiving a backup beam reconfiguration message from the one of the base station and the non-terrestrial network part, the backup beam configuration message comprising an indication of a backup configuration that has been updated by the one of the base station and the non-terrestrial network part based on the transmitted assistance information to indicate one or more others of the spot beams, the one or more others of the spot beams being backups to the first spot beam in case of beam failure of the first spot beam.

Paragraph 18. A method according to Paragraph 17, wherein the assistance information comprises a location report, the location report indicating a geographical area in which the communications device is located.

Paragraph 19. A method according to Paragraph 17 or Paragraph 18, comprising
detecting, on the first spot beam satisfying a beam failure condition, beam failure of the first spot beam,
selecting one of the one or more others of the spot beams to use for transmitting signals to and receiving signals from the one of the base station and the non-terrestrial network part,
providing an indication to the one of the base station and the non-terrestrial network part of the selected one of the one or more others of the spot beams, and
transmitting signals to the one of the base station and the non-terrestrial network part in using the selected one of the one or more others of the spot beams.

Paragraph 20. A method according to any of Paragraphs 17 to 19, comprising
detecting, on the first spot beam satisfying a beam failure condition, beam failure of the first spot beam,
selecting one of the one or more others of the spot beams to use for transmitting signals to and receiving signals from the one of the base station and the non-terrestrial network part, wherein each of the one or more others of the spot beams is associated with a reserved set of resources of the wireless access interface, the reserved set of radio resources associated with each of the one or more others of the spot beams being unique to that spot beam, and
transmitting signals to the one of the base station and the non-terrestrial network part in the reserved set of resources associated with the selected one of the one or more others of the spot beams.

Paragraph 21. A method according to Paragraph 20, where an indication of the reserved set of radio resources associated with each of the one or more others of the spot beams is received by the communications device in system information broadcasted by the one of the base station and the non-terrestrial network part.

Paragraph 22. A method according to Paragraph 20 or Paragraph 21, wherein an indication of the reserved set of radio resources associated with each of the one or more others of the spot beams is received by the communications device via dedicated signalling from the one of the base station and the non-terrestrial network part.

Paragraph 23. A method according to any of Paragraphs 19 to 22, wherein the beam failure condition comprises a determination by the communications device that a measured characteristic of signals received using the first spot beam falls below a predetermined threshold.

Paragraph 24. A method according to Paragraph 23, wherein the measured characteristic is at least one of a relative quality of the signals, a power with which the signals are received, and an error rate of the received signals.

Paragraph 25. A method according to any of Paragraphs 19 to 24, wherein the selected one of the one or more others of the spot beams is selected based on the selected spot beam having a highest reference signal received power from among the one or more others of the spot beams.

Paragraph 26. A method according to any of Paragraphs 19 to 25, comprising
- determining whether an acknowledgement has been received from the one of the base station and the non-terrestrial network part after the communications device has transmitted the signals to the one of the base station and the non-terrestrial network part using the selected one of the one or more others of the spot beams, the acknowledgement indicating that the signals have been successfully received by the one of the base station and the non-terrestrial network part via the one of the one or more others of the spot beams, and
- performing, if the communications device determines that the acknowledgement has not been received, a legacy beam failure recovery process.

Paragraph 27. An infrastructure equipment forming part of a wireless communications network, the wireless communications network comprising a base station and a non-terrestrial network part, the non-terrestrial network part transmitting a plurality of spot beams to provide a wireless access interface for transmitting signals to and receiving signals representing data from a communications device within a coverage region formed by a first of the spot beams, wherein the infrastructure equipment comprises transceiver circuitry and controller circuitry configured in combination
- to receive assistance information from the communications device,
- to identify, based on the received assistance information, that a backup configuration should be updated to indicate one or more others of the spot beams, the one or more others of the spot beams being backups to the first spot beam in case of beam failure of the first spot beam, and
- to transmit a backup beam reconfiguration message to the communications device, the backup beam configuration message comprising an indication of the updated backup configuration.

Paragraph 28. Circuitry for an infrastructure equipment forming part of a wireless communications network, the wireless communications network comprising a base station and a non-terrestrial network part, the non-terrestrial network part transmitting a plurality of spot beams to provide a wireless access interface for transmitting signals to and receiving signals representing data from a communications device within a coverage region formed by a first of the spot beams, wherein the infrastructure equipment comprises transceiver circuitry and controller circuitry configured in combination
- to receive assistance information from the communications device,
- to identify, based on the received assistance information, that a backup configuration should be updated to indicate one or more others of the spot beams, the one or more others of the spot beams being backups to the first spot beam in case of beam failure of the first spot beam, and
- to transmit a backup beam reconfiguration message to the communications device, the backup beam configuration message comprising an indication of the updated backup configuration.

Paragraph 29. A communications device configured to operate in a wireless communications network, the wireless communications network comprising a base station and a non-terrestrial network part, the non-terrestrial network part transmitting a plurality of spot beams to provide a wireless access interface for transmitting signals to and receiving signals representing data from a communications device within a coverage region formed by a first of the spot beams, wherein the communications device comprises transceiver circuitry and controller circuitry configured in combination
- to transmit assistance information to one of the base station and the non-terrestrial network part, and
- to receive a backup beam reconfiguration message from the one of the base station and the non-terrestrial network part, the backup beam configuration message comprising an indication of a backup configuration that has been updated by the one of the base station and the non-terrestrial network part based on the transmitted assistance information to indicate one or more others of the spot beams, the one or more others of the spot beams being backups to the first spot beam in case of beam failure of the first spot beam.

Paragraph 30. Circuitry for a communications device configured to operate in a wireless communications network, the wireless communications network comprising a base station and a non-terrestrial network part, the non-terrestrial network part transmitting a plurality of spot beams to provide a wireless access interface for transmitting signals to and receiving signals representing data from a communications device within a coverage region formed by a first of the spot beams, wherein the communications device comprises transceiver circuitry and controller circuitry configured in combination
- to transmit assistance information to one of the base station and the non-terrestrial network part, and
- to receive a backup beam reconfiguration message from the one of the base station and the non-terrestrial network part, the backup beam configuration message comprising an indication of a backup configuration that has been updated by the one of the base station and the non-terrestrial network part based on the transmitted assistance information to indicate one or more others of the spot beams, the one or more others of the spot beams being backups to the first spot beam in case of beam failure of the first spot beam.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811, "Study on New Radio (NR) to support non terrestrial networks (Release 15)", 3rd Generation Partnership Project, December 2017.
[2] Holma H. and Toskala A, "LTE for UMTS OFDMA and SC-FDMA based radio access", John Wiley and Sons, 2009.
[3] RP-172834, "Revised WID on New Radio Access Technology," NTT DOCOMO, RAN #78.
[4] TR 38.913, "Study on Scenarios and Requirements for Next Generation Access Technologies (Release 14)", 3rd Generation Partnership Project.
[5] TS 38.300, "NR and NG-RAN Overall Description; Stage 2 (Release 15)", 3rd Generation Partnership Project.

What is claimed is:

1. A method for operating an infrastructure equipment forming part of a wireless communications network, the wireless communications network comprising a base station and a non-terrestrial network part, the non-terrestrial network part transmitting a plurality of spot beams to provide a wireless access interface for transmitting signals to and receiving signals representing data from a communications device within a coverage region formed by a first of the spot beams, the method comprising:
receiving assistance information from the communications device,
identifying, based on the received assistance information, that a backup configuration should be updated to indicate one or more others of the spot beams, the one or more others of the spot beams being backups to the first spot beam in case of beam failure of the first spot beam,
transmitting a backup beam reconfiguration message to the communications device, the backup beam configuration message comprising an indication of the updated backup configuration,
wherein each of the spot beams is associated with a reserved set of radio resources of the wireless access interface, the reserved set of radio resources associated with each of the spot beams being unique to that spot beam,
transmitting an indication of the reserved set of radio resources associated with each of the one or more others of the spot beams to the communications device,
receiving signals from the communications device in the reserved set of radio resources associated with one of the one or more others of the spot beams instead of the first spot beam,
determining, based on the reserved set of radio resources in which the signals are received, that the communications device has detected beam failure of the first spot beam, and
transmitting an acknowledgement to the communications device, the acknowledgement indicating that the signals have been successfully received by the infrastructure equipment via the one of the one or more others of the spot beams.

2. The method according to claim 1, wherein the assistance information comprises a location report, the location report indicating a geographical area in which the communications device is located.

3. The method according to claim 2, wherein the identifying that the backup configuration should be updated is further based on one or more of ephemeris information of the non-terrestrial network part, a satellite constellation comprising the non-terrestrial network part, and a beam distribution of one or more of the plurality of spot beams transmitted by the non-terrestrial network part.

4. The method according to claim 1, wherein the indication of the reserved set of radio resources associated with each of the one or more others of the spot beams is in system information broadcasted by the infrastructure equipment.

5. The method according to claim 1, wherein the indication of the reserved set of radio resources associated with each of the one or more others of the spot beams is transmitted to the communications device by the infrastructure equipment via dedicated signalling.

6. The method according to claim 1, wherein the coverage region formed by the first spot beam varies over time in accordance with a motion of the non-terrestrial network part with respect to the surface of the Earth.

7. The method according to claim 1, wherein
a trajectory of the non-terrestrial network part is such that the coverage region formed by the first spot beam is substantially constant over a time period.

8. The method according to claim 1, wherein the infrastructure equipment is the non-terrestrial network part.

9. The method according to claim 1, wherein the infrastructure equipment is the base station.

10. The method according to claim 1, wherein the non-terrestrial network part comprises a satellite, an airborne vehicle or an airborne platform.

11. The method according to claim 1, wherein the communications device is a user equipment.

12. The method according to claim 1, wherein the communications device is acting as a relay node for one or more user equipment, each of the one or more user equipment being in one of an RRC connected mode, an RRC idle state or an RRC inactive state.

13. The method according to claim 1, wherein each of the spot beams is a different one of a set of Transmission Configuration Indication, TCI, states.

14. An infrastructure equipment forming part of a wireless communications network, the wireless communications network comprising a base station and a non-terrestrial network part, the non-terrestrial network part transmitting a plurality of spot beams to provide a wireless access interface for transmitting signals to and receiving signals representing data from a communications device within a coverage region formed by a first of the spot beams, wherein the infrastructure equipment comprises transceiver circuitry and controller circuitry configured in combination
to receive assistance information from the communications device,
to identify, based on the received assistance information, that a backup configuration should be updated to indicate one or more others of the spot beams, the one or more others of the spot beams being backups to the first spot beam in case of beam failure of the first spot beam, to transmit a backup beam reconfiguration message to the communications device, the backup beam configuration message comprising an indication of the updated backup configuration, wherein each of the spot beams is associated with a reserved set of radio resources of the wireless access interface, the reserved set of radio resources associated with each of the spot beams being unique to that spot beam, to transmit an indication of the reserved set of radio resources associated with each of the one or more others of the spot beams to the communications device, to receive signals from the communications device in the reserved set of radio resources associated with one of the one or more others of the spot beams instead of the first spot beam, to determine, based on the reserved set of radio resources in which the signals are received, that the communications device has detected beam failure of the first spot beam, and to transmit an acknowledgement to the communications device, the acknowledgement indicating that the signals have been successfully received by the infrastructure equipment via the one of the one or more others of the spot beams.

15. A communications device configured to operate in a wireless communications network, the wireless communications network comprising a base station and a non-terrestrial network part, the non-terrestrial network part transmitting a plurality of spot beams to provide a wireless access interface for transmitting signals to and receiving signals representing data from a communications device within a coverage region formed by a first of the spot beams, wherein the communications device comprises transceiver circuitry and controller circuitry configured in combination to transmit assistance information to one of the base station and the non-terrestrial network part, and to receive a backup beam reconfiguration message from the one of the base station and the non-terrestrial network part, the backup beam configuration message comprising an indication of a backup configuration that has been updated by the one of the base station and the non-terrestrial network part based on the transmitted assistance information to indicate one or more others of the spot beams, the one or more others of the spot beams being backups to the first spot beam in case of beam failure of the first spot beam, wherein each of the spot beams is associated with a reserved set of radio resources of the wireless access interface, the reserved set of radio resources associated with each of the spot beams being unique to that spot beam, to receive an indication of the reserved set of radio resources associated with each of the one or more others of the spot beams from the one of the base station and the non-terrestrial network part, to transmit signals to the one of the base station and the non-terrestrial network part in the reserved set of radio resources associated with one of the one or more others of the spot beams instead of the first spot beam, and to receive an acknowledgement from the one of the base station and the non-terrestrial network part, the acknowledgement indicating that the signals have been successfully received by the one of the base station and the non-terrestrial network part via the one of the one or more others of the spot beams.

\* \* \* \* \*